United States Patent Office 3,077,468
Patented Feb. 12, 1963

3,077,468
INSOLUBILIZATION OF POLYSACCHARIDE ETHERS
Robert M. Geurden, Wilmington, Del., assignor to Hercules Powder Company, Wilmington, Del., a corporation of Delaware
No Drawing. Filed Dec. 22, 1960, Ser. No. 77,495
10 Claims. (Cl. 260—232)

The present invention relates to the insolubilization of water-soluble hydroxyalkyl polysaccharide ethers. The term "hydroxyalkyl polysaccharide ethers" is used herein to mean ethers of polysaccharides containing hydroxyalkyl groups, including, e.g., polysaccharide ethers containing ohter substituent groups besides the hydroxyalkyl group, hydroxyalkyl carboxyalkyl polysaccharide ethers being a specific example of the latter. The term "insolubilizing" is used herein to mean substantially reducing the water solubility of hydroxyalkyl polysaccharide ethers.

I have found according to this invention that the water solubility of water-soluble hydroxyalkyl polysaccharide ethers is substantially reduced by reacting said ethers with unsaturated dibasic aliphatic acids or their anhydrides and the water-soluble derivatives of said acids and anhydrides, hereinafter sometimes referred to as insolubilizing agents. The quite surprising feature of my invention is that such reduction in solubility peaks when using very low amounts of said insolubilizing agents. Thus I obtain a substantial reduction in the water solubility of hydroxyalkyl polysaccharide ethers by reacting same with very small amounts of said insolubilizing agents. For example, I have obtained excellent results by reacting hydroxyalkyl cellulose ethers such as hydroxyethyl cellulose and hydroxy alkyl starch ethers such as hydroxyethyl starch with as low as about 2% by weight thereof of insolubilizing agents.

The following examples illustrate specific embodiments of the present invention, but they are not intended to limit the invention other than as defined in the claims of this application. In the examples and elsewhere herein percent is by weight. Except as otherwise indicated hereinafter, the procedure used for carrying out the examples below was as follows.

A 5% aqueous solution of material to be insolubilized was prepared and the insolubilizing agent was added to this solution while stirring. Films were cast on glass plates from the resulting mixture. The films were then dried under the conditions stated. These films measured approximately 75 mils thick when wet and 2 mils thick when dry. The dried films were stripped from the glass plates and their water properties were determined as follows. Determination of percent insoluble—a 1 cm. square portion of dried film was weighed immediately after drying and promptly soaked by immersing in 500 ml. of distilled water at room temperature (approximately 25° C.) for one hour and then dried to constant weight and finally weighed. The percent insoluble values were calculated by the formula: weight of dry film after soaking divided by weight of dry film before soaking. Determination of percent swell—a 1 cm. square portion of dried film was weighed immediately after drying and then promptly soaked by immersing in 500 ml. of distilled water at room temperature for one hour and then blotted off with an ink blotter and finally weighed. The percent swell values were calculated by the formula: weight of blotted film minus weight of dried film divided by weight of dried film. The films were dried at 100° C. Further details are given in Table 1 below.

TABLE 1

| Example | Material Insolubilized | Insolubilizing Agent | | Temp., °C. | Water Properties of Film, Percent Insoluble |
|---|---|---|---|---|---|
| | | Type | Amount [1] | | |
| 1 | HEC | Maleic anhydride | 1 | 100 | 81.35 |
| 2 | HEC | ---do--- | 2 | 100 | 90.66 |
| 3 | HEC | ---do--- | 4 | 100 | 92.39 |
| 4 | HEC | ---do--- | 6 | 100 | 93.02 |
| 5 | HEC | ---do--- | 8 | 100 | 94.73 |
| 6 | HEC | ---do--- | 12 | 100 | 82.11 |

[1] Percent by weight of the hydroxyethyl cellulose (HEC) used.

The examples in this application show that the extent of insolubilization increases to a peak with very small amounts of insolubilizing agent and then becomes more soluble again with greater amounts of insolubilizing agent. This peak was found to be 2% with maleic anhydride and hydroxyethyl cellulose. From 2% to 8% the percent insolubilization practically leveled off and then sharply decreased so that the insolubilization at 12% was sustantially the same as at 1%. Thus the amount of insolubilizing agent is critical and should fall within the range of about 2%–8% by weight of the material being insolubilized.

I have found according to this invention that this difference in percent insolubilization can be explained with reference to the mechanism of the insolubilization reaction. Up to about 8% insolubilizing agent, all of the insolubilization reaction occurs by cross-linking through both of the carboxyl groups of the insolubilizing agent. Above about 8% insolubilizing agent gives even somewhat more cross-linking through both carboxyls than is obtained with about 8% and below, and therefore one might expect a greater degree of insolubilization; however, the percent insolubilization actually decreases because most of the excess above 8% of the insolubilizing agent is consumed through reaction of only one of the carboxyl groups of the insolubilizing agent, thereby introducing free carboxyl groups which are hydrophilic and therefore decrease the percent insolubilization which has been obtained with up to about 8% insolubilizing agent. With amounts of insolubilizing agent up to about 2% the percent insolubilization is not as high as desired because this is not enough insolubilizing agent to cross-link with a suffiient percentage of the polysaccharide derivative chains.

The above-mentioned insolubilization mechanism was determined by measuring the acid numbers on films cross-linked with different amounts of insolubilizing agent ranging from 1%–16%. Thus the following experiments were carried out.

First, in order to remove any unreacted insolubilizing agent the films were soaked in a solvent for the insolubilizing agent. For instance, each film (2" x 4" x 2 mils thick) was immersed to 40 ml. of anhydrous isopropyl alcohol in a flask for 16 hours. The isopropyl alcohol was decanted and the films were rinsed with fresh isopropyl alcohol. In order to determine the amount, if any, of unreacted insolubilizing agent all the decanted isopropyl alcohol and the rinsed isopropyl alcohol were combined and titrated to phenolphthalein endpoint after adding 50 ml. of water and heating almost to boiling to hydrolyze any insolubilizing agent.

The residual carboxyl groups on the film were determined by immersing each film in 40 ml. of 75% ethyl alcohol (ASTM-D-871-56 Procedure), heating at 60° C. for 30 minutes, cooling and titrating the resulting aqueous alcohol in the presence of the film with a .5 N aqueous sodium hydroxide solution to phenolphthalein endpoint.

In order to determine the number of ester linkages (both mono- and di-) in the film, additional .5 N aqueous sodium hydroxide solution was added to this titrated aqueous alcohol solution containing the film until the total volume reached 80 ml. The flask was heated for 15 minutes at 60° C. and allowed to stand for about 36 hours. Then the solution was titrated in the presence of the film with .5 N hydrochloric acid to slight excess acidity and back-titrated again with .5 N aqueous sodium hydroxide solution to phenolphthalein endpoint.

The analytical results of these experiments are shown in Table 2 which follows. All films were HEC films insolubilized with maleic anhydride.

TABLE 2

| Maleic Anhydride, percent by Wt. of HEC | Acid Number | | |
|---|---|---|---|
| | Extract from Film [1] | Extracted Film [2] | Extracted Film After Saponification [3] |
| None | 4.7 | 15.1 | 53.3 |
| 1 | 1.4 | 4.5 | 27.3 |
| 2 | 1.5 | 8.5 | 32.1 |
| 4 | 4.6 | 17.2 | 47.6 |
| 8 | 8.2 | 22.0 | 72.0 |
| 12 | 19.1 | 29.4 | 98.8 |
| 16 | 46.1 | 28.6 | 103.0 |

[1] See column 2, lines 58-64; column 3, lines 1-5.
[2] See column 3, lines 6-12.
[3] See the paragraph beginning at line 13 in column 3.

It is quite apparent from Table 2 above that with the films made using about 2%-8% insolubilizing agent substantially no unreacted insolubilizing agent was found whereas with the films made using amounts outside this range and particularly above about 8% insolubilizing agent a substantial amount of unreacted insolubilizing agent was found. Also, in contrast with the other experiments substantial amounts of insolubilizing agent were consumed through reaction with only one of the carboxyl groups of the insolubilizing agent when using amounts of insolubilizing agent above about 8%.

*Example 7*

This example shows treating carboxymethyl hydroxyethyl cellulose (CMHEC) in accordance with this invention. The same process was used as was used for Examples 1-6 above except that the water properties of the films were measured only qualitatively. Films prepared with CMHEC which had been insolubilized by drying in admixture with 8% maleic anhydride were left immersed in the distilled water for 4 days and then removed and observed. Some films were dried at room temperature and the others were dried at 100° C. The reduction in water solubility and water sensitivity of these films compared favorably with those in Examples 1-6 above.

*Example 8*

This example shows treating hydroxyethyl starch (HES) in accordance with this invention. Since free films are not readily prepared from HES because they are too brittle to strip from the support on which they are cast (unless a plasticizer is used, and this would interfere with determining the effects of the present invention), the effectiveness of this invention to insolubilize hydroxyalkyl starch derivatives was determined by using HES and HEC insolubilized in accordance with this invention as a permanent size for fabrics. Aqueous solutions of HES and HEC were prepared as in Examples 1-6 above, but instead of casting films from the solutions, cloth was sized with them. Thus, the HES and HEC aqueous solutions were applied to bleached Indian Head cotton swatches having a total of 80 threads per square inch in both the warp and fill direction. Equal amounts of each solution was applied to the swatches in each experiment. The swatches were dried at room temperature, sprinkled and ironed at cotton setting and measured for stiffness. The procedure used to determine stiffness was ASTM-D-1388-55-T. The initial swatches were large enough (24" x 8") so that 24 pieces 1 inch by 6 inches could be cut from them (12 pieces in the warp direction and 12 pieces in the fill direction). In order to get the stiffness of the initial large swatches, the first two small swatches were cut from each of the large swatches and the stiffness measured before any washing. Thereafter each successive pair of swatches were cut and measured for stiffness after 1, 2, 3, etc., washings until the last pair of swatches had been subjected to 12 washings before they were cut and measured for stiffness. The washings were carried out in a conventional tergotometer using 20-minute cycles in 1,000 ml. of distilled water plus 60 ml. of synthetic hard water at 110° F. containing 3 grams of synthetic detergent. The initial stiffness values and the stiffness values after washing are given in Table 3 below for the swatches treated with aqueous solutions of HES-maleic anhydride mixtures and for the swatches treated with aqueous solutions of HEC and maleic anhydride mixtures as permanent sizes.

TABLE 3

*Stiffness*

| After Washing | Control | | HES-MA [1] | | HEC-MA | |
|---|---|---|---|---|---|---|
| | Warp | Fill | Warp | Fill | Warp | Fill |
| zero | 4.8 | 3.6 | 11.1 | 9.4 | 10.0 | 9.0 |
| third | 4.6 | 4.0 | 10.1 | 8.6 | 8.8 | 8.3 |
| sixth | 4.6 | 3.9 | 9.4 | 8.1 | 7.8 | 6.7 |
| ninth | 4.9 | 4.3 | 10.1 | 7.8 | 6.7 | 6.5 |
| twelfth | 5.0 | 4.2 | 9.6 | 8.2 | 7.3 | 6.7 |

[1] MA = maleic anhydride.

From Table 3 above it is readily apparent that the HES was more completely insolubilized than the HEC by treatment in accordance with this invention.

*Example 9*

Substituting HPS for the HES in Example 8 above also gave very satisfactory results in accordance with my invention.

*Examples 10 and 11*

Several experiments were carried out under substantially the same conditions as Examples 1-8 above except that citraconic anhydride and itaconic anhydride were used (separately) instead of maleic anhydride. Although the results formed the same pattern as those with maleic anhydride, the percent insolubilization was slightly lower with itaconic anhydride.

As those skilled in this art will appreciate, many variations may be made within the scope of the claims of this application. The present invention is applicable broadly to unsaturated dibasic aliphatic acids, the anhydrides of said acids, and the water-soluble derivatives of said acids and anhydrides. These include, e.g. maleic acid, maleic anhydride, citraconic acid, itaconic acid, glutaconic acid and dihydromuconic acid.

This invention is applicable to water-soluble hydroxyalkyl polysaccharide ethers including hydroxyalkyl cellulose ethers, e.g. hydroxyethyl celluose, hydroxypropyl cellulose; carboxyalkyl hydroxyalkyl cellulose ethers, e.g. carboxymethyl hydroxyethyl cellulose, carboxymethyl hydroxypropyl cellulose; dialkylaminoalkyl hydroxyalkyl cellulose ethers, e.g. diethylaminoethyl hydroxyethyl cellulose, diethylaminoethyl hydroxypropyl cellulose, dimethylaminoethyl hydroxypropyl cellulose; hydroxyalkyl starch ethers, e.g. hydroxyethyl starch, hydroxypropyl starch; dialkylaminoalkyl hydroxyalkyl starch ethers, e.g. diethylaminoethyl hydroxyethyl starch, diethylaminoethyl hydroxypropyl starch, dimethylaminoethyl hydroxypropyl starch.

In general, the time of the insolubilization reaction to obtain maximum insolubility is the time required to render substantially dry the aqueous mixture of the insolubilizing agent and the material to be insolubilized. This, in turn, will depend on the temperature used; the higher the temperature the shorter the time and conversely. I have obtained good results at room temperatures, 100° C. and 130° C. Of course, the maximum temperatures should be below that which would decompose or otherwise seriously damage the mixture or product being made therefrom.

The degree of substitution (D.S.) and the viscosity of the materials to be insolubilized used in the above examples were as follows: HEC—2.50 D.S. and medium viscosity; HES—.62 D.S. and a 5% viscosity of 640 cps. at 25° C.; CMHEC—.3 carboxyalkyl D.S., .7 hydroxyalkyl D.S. and medium viscosity. This invention is applicable to hydroxyalkyl polysaccharide ethers irrespective of the degree of substitution or viscosity of said ethers. Thus I have obtained satisfactory results in accordance with this invention employing said ethers having a wide range of degree of substitution and viscosity. For instance, I have used said ethers having low, medium and high viscosities and having both lower and higher degrees of substitution than those shown in the above examples.

As will be seen from the foregoing the products of this invention are useful in preparing water-insoluble films and permanent sizes for fabrics. In addition, I have found that these products are applicable as protective coatings. In all of these and similar applications where it is desirable that the final product be water-insoluble to a high degree, it is highly desirable that the product can be applied from high solids content aqueous solutions thereof and then insolubilized after application. This makes the product very practical and economical to use.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of reducing the water solubility of water-soluble hydroxyalkyl ethers of starch and cellulose which comprises reacting same with an insolubilizing agent selected from the group consisting of unsaturated dibasic aliphatic acids and their anhydrides, and the water-soluble derivatives of said acids and anhydrides which retain the ability of the acids and anhydrides from which they are derivatized to cross-link through both of their carboxyl groups and thereby effect insolubilization of said water-soluble hydroxyalkyl ethers of starch and cellulose, the amount of said insolubilizing agent being about 2%–8% by weight of said ether employed.

2. Process of claim 1 wherein said ether is a hydroxyalkyl cellulose.

3. Process of claim 1 wherein said ether is a hydroxyalkyl starch.

4. Process of claim 1 wherein said ether is hydroxyethyl cellulose.

5. Process of claim 1 wherein said ether is hydroxyethyl starch.

6. Process of claim 1 wherein said ether is a carboxyalkyl hydroxyalkyl cellulose.

7. Process of claim 1 wherein said ether is carboxymethyl hydroxyethyl cellulose.

8. Process of claim 1 wherein said insolubilizing agent is maleic anhydride.

9. Process of claim 1 wherein said insolubilizing agent is citraconic acid.

10. Process of claim 1 wherein said insolubilizing agent is itaconic acid.

References Cited in the file of this patent
UNITED STATES PATENTS

| | | |
|---|---|---|
| 2,170,017 | Frey et al. | Aug. 22, 1939 |
| 2,270,200 | Upright | Jan. 13, 1942 |
| 2,489,225 | Morris | Nov. 22, 1949 |
| 2,794,799 | Hiatt et al. | June 4, 1957 |